United States Patent
Mei et al.

(10) Patent No.: US 11,361,481 B2
(45) Date of Patent: Jun. 14, 2022

(54) 3D SHADOW REDUCTION SIGNAL PROCESSING METHOD FOR OPTICAL COHERENCE TOMOGRAPHY (OCT) IMAGES

(71) Applicant: Topcon Corporation, Tokyo (JP)

(72) Inventors: Song Mei, Franklin Park, NJ (US); Zaixing Mao, Edgewater, NJ (US); Ying Dong, Warren, NJ (US); Zhenguo Wang, Ridgewood, NJ (US); Kinpui Chan, Ridgewood, NJ (US)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 16/574,453

(22) Filed: Sep. 18, 2019

(65) Prior Publication Data

US 2021/0082163 A1    Mar. 18, 2021

(51) Int. Cl.
*G06T 11/00* (2006.01)
*G06T 7/11* (2017.01)
*G06T 5/20* (2006.01)
*G06T 7/00* (2017.01)

(52) U.S. Cl.
CPC ............. *G06T 11/008* (2013.01); *G06T 5/20* (2013.01); *G06T 7/0012* (2013.01); *G06T 7/11* (2017.01);
(Continued)

(58) Field of Classification Search
CPC . G06T 11/008; G06T 7/11; G06T 5/20; G06T 7/0012; G06T 2207/10101
See application file for complete search history.

(56) References Cited

U.S. PATENT DOCUMENTS 6,763,129 B1 *   7/2004  Honda ................... G06K 9/40
                                                    382/132
8,831,304 B2 *   9/2014  Xu ..................... G01B 9/02091
                                                    382/128

(Continued)

FOREIGN PATENT DOCUMENTS

WO      2016175707 A1      11/2016
WO   WO-2016175707 A1 *   11/2016   ........... A61B 5/7264

OTHER PUBLICATIONS

Subhash H.M., Wang R.K. (2013) Optical Coherence Tomography: Technical Aspects. In: Liang R. (eds) Biomedical Optical Imaging Technologies. Biological and Medical Physics, Biomedical Engineering. Springer, Berlin, Heidelberg, https://doi.org/10.1007/978-3-642-28391-8_5 (Year: 2013).*

(Continued)

*Primary Examiner* — Vu Le
*Assistant Examiner* — Courtney Joan Nelson
(74) *Attorney, Agent, or Firm* — Pearne & Gordon LLP

(57) ABSTRACT

Shadows caused by opacities and obstructions (such as blood vessels) can block detection of structural information of objects below the shadow-causing structure, affecting visualization and analysis of those deeper structures. An image processing method for removing these shadows includes applying a low pass filter to an energy profile of an image to remove high frequency fluctuations in energy, thereby effectively recovering lower energy inside shadow regions and removing high frequency speckle. The image is then adjusted, for example by linear scaling, based on the filtered energy profile. Two dimensional filters may also be applied for volumes.

18 Claims, 9 Drawing Sheets

(52) U.S. Cl.
CPC ............... *G06T 2207/10101* (2013.01); *G06T 2207/30041* (2013.01); *G06T 2207/30088* (2013.01)

(56) References Cited

U.S. PATENT DOCUMENTS

| | | | |
|---|---|---|---|
| 9,572,495 B2* | 2/2017 | Schmitt | A61B 5/6852 |
| 2013/0208240 A1* | 8/2013 | Sharma | G06T 7/11 351/206 |
| 2016/0100755 A1* | 4/2016 | Chen | A61B 3/102 382/131 |
| 2017/0119242 A1 | 5/2017 | Jia et al. | |
| 2017/0148161 A1* | 5/2017 | Griffin | G06T 7/13 |
| 2017/0169590 A1* | 6/2017 | Huang | A61B 3/102 |
| 2018/0182082 A1 | 6/2018 | Jia et al. | |
| 2018/0353077 A1 | 12/2018 | Strouthidis et al. | |

OTHER PUBLICATIONS

Patrick J Whelan, Electromyogram recordings from freely moving animals, Methods, vol. 30, Issue 2, 2003, pp. 127-141, ISSN 1046-2023, https://doi.org/10.1016/S1046-2023(03)00074-4.) (Year: 2003).*

Mari et al. "Enhancement of Lamina Cribrosa Visibility in Optical Coherence Tomography Images Using Adaptive Compensation", Investigative Ophthalmology & Visual Science, Mar. 2013, vol. 54, No. 3, pp. 2238-2247 (Year: 2013).*

Fabritius et al., "Automated retinal shadow compensation of optical coherence tomography images", Journal of Biomedical Optics Letters, Jan./Feb. 2009, vol. 14(1), pp. 1-3.

Girard, et al., "Shadow Removal and Contrast Enhancement in Optical Coherence Tomography Images of the Human Optic Nerve Head", Investigative Ophthalmology & Visual Science, Sep. 2011, vol. 52, No. 10, pp. 7738-7748.

Mari et al., "Ehancement of Lamina Cribrosa Visibility in Optical Coherence Tomography Images Using Adaptive Compensation", Investigative Ophthalmology & Visual Science, Mar. 2013, vol. 54, No. 3, pp. 2238-2247.

Extended European Search Report for European Application No. 20196865.8 dated Feb. 12, 2021.

Hell, et al., "High resolution imaging in microscopy and ophthalmology: new frontiers in biomedical optics", Springer Verlag, Cham; Switzerland, XP0557719,29; Chs. 2 and 6; Section 2.2.2, Figs. 2.6-2.9, and Section 6.3.1 (as cited in EESR), Aug. 13, 2019.

* cited by examiner

3D SHADOW REDUCTION SIGNAL PROCESSING METHOD FOR OPTICAL COHERENCE TOMOGRAPHY (OCT) IMAGES

BACKGROUND

Optical coherence tomography (OCT) is an imaging technique that involves impinging a light beam (e.g., from a laser light source) on an object being imaged (e.g., an eye). The light from the beam may be absorbed or backscattered by various structures in the object (e.g., different retinal layers and blood vessels). The backscattered light is combined with light from a reference beam and detected/digitized. An image of the structure of the object may then be constructed based on the principles of interferometry.

Because the impinging light axially penetrates the object, shadows may be caused by attenuation of signal behind an absorbing of scattering opacity or obstruction. In other words, opacities and obstructions may cause shadows blocking detection of structural information of the object below the shadow-causing structure, and affect any visualization and quantitative analysis of deeper structures. For example, in retinal OCT imaging, such shadows may be caused by blood vessels and affect analysis of structures deeper in the retina. FIG. 1 illustrates an example retinal OCT B-scan with shadows indicated by the arrows therein.

Beyond producing a displeasing image, such shadow artifacts create problems in analysis of the resulting images. For example, in posterior eye image, shadows can negatively influence the visualization of deep structures such as choroid, thereby affecting analyses of the choroid such as determining the choroidal vascularity index (CVI). And in OCT images near the optic nerve head (ONH), shadows cast by vessels attenuate structural signals, which can make it difficult to detect the lamina cribrosa (LC) boundary. As a result, the ability to effectively diagnose glaucoma may be impaired.

One existing method for reducing shadows (also referred to herein as artifacts) uses intensity thresholding-based binarization (ITB) to segment vessel regions. The ITB method compensates showed regions to median energy levels (energy level after compensation) for each depth of non-shadow regions. This requires first obtaining a retinal pigment epithelium (RPE) segmentation; however, manual segmentation is not scalable and auto-segmentation may not always be available or accurate, and is usually computationally heavy. Further, energy levels after compensation are fixed according to the median energy level in non-shadow regions, which may cause alterations to the structural information in the signal. Further, those compensations may not be readily extended to shadow in other settings. Still further, the pixel intensity thresholding used to detect vessel regions may depend on many different parameters, such as vessel size (in that shadows behind smaller vessels tend to be brighter than those behind large vessels), signal-to-noise ratio (SNR) (in that overall pixel intensity in low SNR images is less than in high SNR images, and thus intensity in shadow regions will change accordingly), and an individual's perception of whether a region should be characterized as a shadow.

Another existing method first calculates the energy of each pixel and then divides each pixel intensity by the cumulative energy in an A-line (corresponding to a signal in a depth direction at a given location) below the pixel. Because there is less energy below shadowed regions to be divided by, the shadowed regions are compensated for in the result. The contrast and visualization of deeper layers may then be enhanced because there is less energy below deeper layers; and with an adaptive compensation method, the saturation artifact at the bottom of the A-line can be eliminated. However, this technique requires a contrast change for shadow removal. Therefore, visualization of superficial layers becomes worse and traditional image processing may not be available after compensation. Further, this can create strong artifacts in other areas in the image, for example, causing brightness at a bottom of the image and an artificial horizontal line at the adaptive compensation stopping point.

BRIEF SUMMARY OF THE INVENTION

According to one example of the present disclosure, an image processing method comprises: obtaining an energy profile of an image; low-pass filtering the energy profile; and adjusting the image based on the filtered energy profile.

In various embodiments of the above example, the method further comprises: identifying a structural region within the image, wherein the image is only adjusted within the structural region; the structural region is identified by applying a system noise threshold to the image to generate an upper bound of the structural region and a lower bound of the structural region; the method further comprises: performing additional image processing techniques on the image after adjusting the image; the additional image processing comprises layer segmentation; the image comprises shadow artifacts, and adjusting the image causes attenuation or removal of the shadow artifacts; the image is an optical coherence tomography B-scan; the energy profile is a function of A-lines of the image, and adjusting the image comprises linearly scaling at least one A-line of the image to an energy level of a corresponding A-line in the filtered energy profile; the image is part of a volume and the method further comprises: obtaining a second energy profile of a second image of the volume; filtering the second energy profile; and adjusting the second image based on the filtered second energy profile; the image and the second image are from a fast scanning direction of an imaging protocol used to obtain the volume; the image and the second image are from a slow scanning direction of an imaging protocol used to obtain the volume; and/or only A-lines of an image having a filtered energy greater than an un-filtered energy are adjusted.

According to a second example, an image processing method comprises: obtaining a two-dimensional energy profile of a volumetric imaging data set; filtering the energy profile by applying a two-dimensional filter; and adjusting the volumetric imaging data set based on the filtered energy profile.

In various embodiments of the second example, the method further comprises: identifying volumetric imaging data of the volumetric imaging data set that corresponds to a structural region, wherein only the volumetric imaging data corresponding to the structural region is adjusted; the method further comprises: performing additional image processing techniques on the volumetric imaging data set after adjusting the volumetric imaging data set; the additional image processing comprises layer segmentation; images generated from the volumetric imaging data set comprise shadow artifacts, and adjusting the volumetric imaging data set causes attenuation or removal of the shadow artifacts in at least one of the images; the two-dimensional filter is a low pass filter; and/or the volumetric imaging data set is an optical coherence tomography data set and the volumetric imaging data set is adjusted along a slow scanning direction.

DETAILED DESCRIPTION OF THE INVENTION

Figure 1:
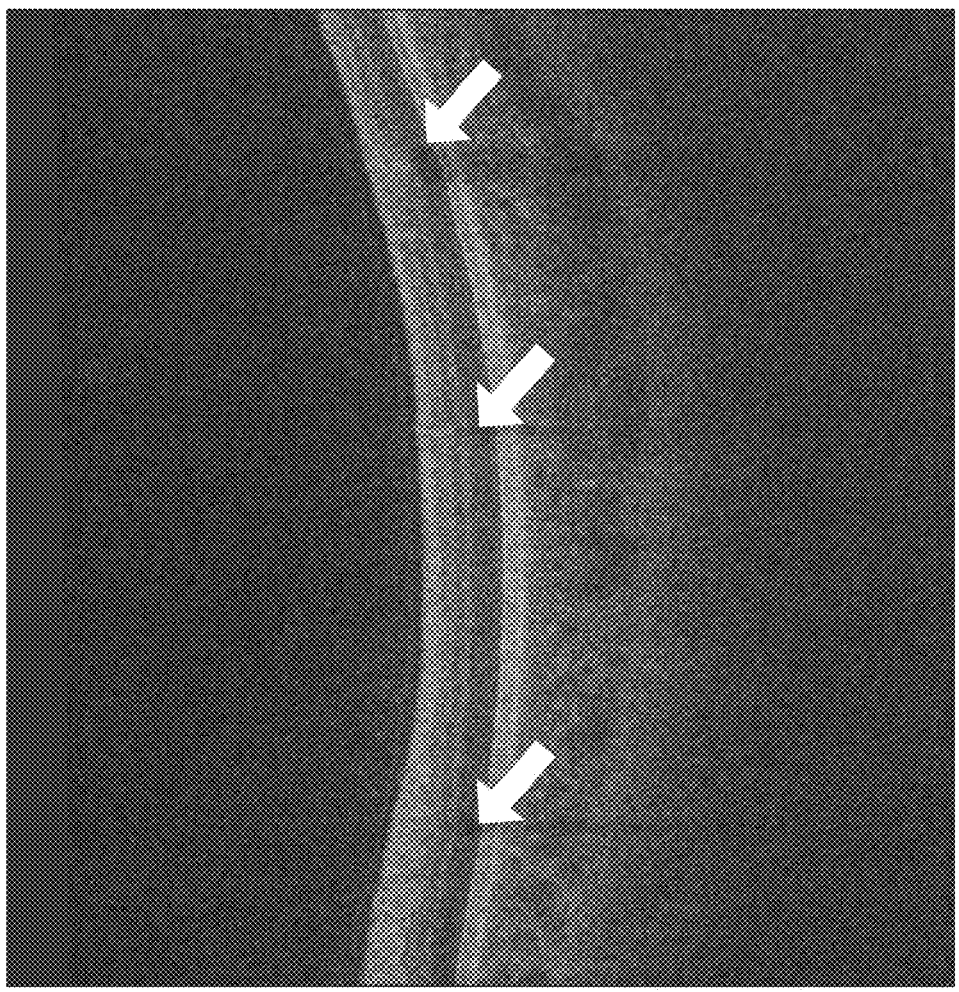
FIG. 1 illustrates an example retinal OCT B-scan with shadows.

The present disclosure describes retinal OCT images as an example image type. However, the disclosure is widely applicable to images that have different signal strengths, images of different structures, and/or images of different modalities. In other words, although the description refers to OCT images of the posterior of the eye, the disclosure is intended to be general and can be applied to other images that suffer from shadow artifact, e.g. anterior of the eye, skin, etc.

In view of the above, the present disclosure relates to a shadow artifact removal method and system that compensates for the lost signal in shadow regions caused by opacities and/or obstructions in the object being imaged. Images compensated according to the present disclosure enable better visualization (without artifact) in deeper structural layers previously affected by shadows. This further enables accurate quantitative analysis of deeper layers (e.g. CVI) by removing confusion caused by shadows.

Moreover, the shadow reduction described herein can avoid the above-noted deficiencies of existing techniques. For example, minimal artifacts may be introduced by the presently described technique, and the contrast of compensated images is preserved to a large extent by not visually altering pixel intensity unless the pixel is in shadow region. In contrast, the above-described conventional techniques may relatively enhance deep structures while more superficial layers in retina are lost due to altering pixel intensities throughout the image. Accordingly, the resultant images can be visualized in any way (B-scans, C-scans, volumes, slab projections or en face images, and the like) as with regular OCT imaging. Additionally, the shadow reduction technique herein can be implemented as a pre-processing step for other existing image analysis or enhancement techniques (e.g., layer segmentation, noise reduction, and the like), and can improve the performance of those additional techniques. For example, the resulting improved signal in a shadow region can improve segmentation accuracy, and speckle noise reduction techniques can result in shadow-reduced and noise-reduced images. This can allow identification and visualization of things never seen before in enhanced images. Such techniques can also be applied directly to the compensated images without having to further adjust for the changes induced by shadow removal itself. In other words, the shadow reduction would not induce significant differences in contrast within B-scans, between different B-scans in the same volume, or between different C-scans at different depths in the same volume after processing.

Still further, the shadow reduction described herein can be implemented as a simple fully-automated process. In other words, the shadow reduction can be inserted at any point in to existing automatic OCT image processing pipelines and is able to batch-process large number of images without human intervention (e.g., adjusting threshold to pick out shadow region, check segmentation accuracy, and the like). Similarly, this reduces processing time because the shadow reduction does not require its own pre-processing methods (e.g. layer segmentation). The shadow reduction can also be applied along the slow acquisition axis to achieve 3D shadow reduction, particularly if the images along the slow axis are registered.

Figure 2:
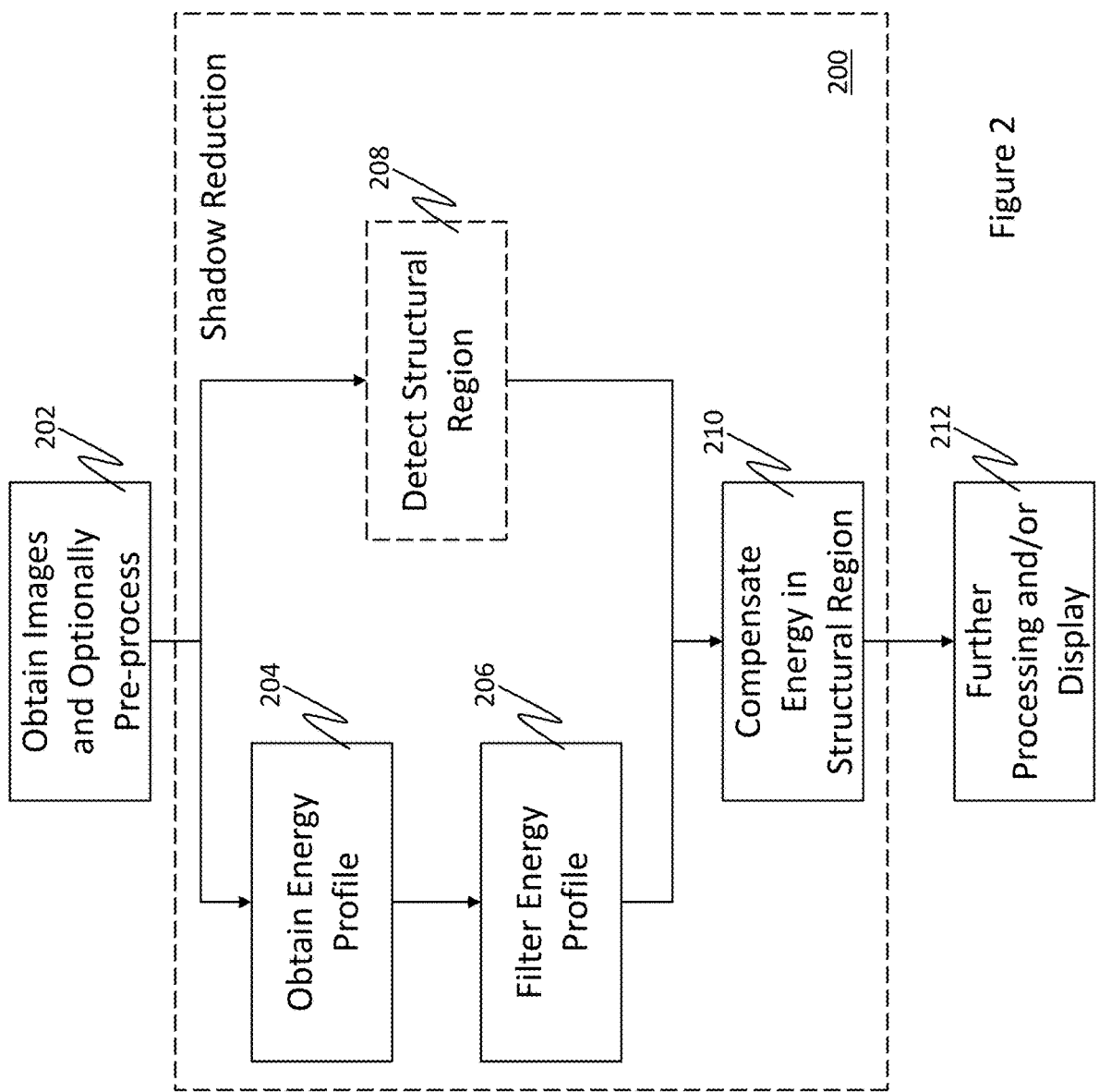
FIG. 2 illustrates a flow chart of an example embodiment of the shadow reduction technique described herein.

The shadow reduction technique 200 of the present disclosure is now described in detail with respect to FIGS. 2-5. As seen in FIG. 2, images are initially obtained 202 from an imaging modality, such as OCT. These images may be taken at any point prior to applying the shadow reduction technique 200. Each image is preferably a two-dimensional (2D) image (e.g., a B-scan, C-scan, or en face image), and each collection of images may represent a three-dimensional (3D) volume of an imaged object. In other embodiments, a collection of unrelated images (e.g., those that do not collectively form a volume) may be analyzed individually. Further, the images may be pre-processed 202 in any manner prior to applying the shadow reduction technique 200. For example, pre-processing can include log-linear/linear-log conversion, noise reduction or averaging of repeated scans (or other pre-processing techniques that can improve a signal-to-noise ratio), contrast enhancement techniques, and the like.

The shadow reduction technique 200 itself then generally comprises four steps performed on the obtained images (either individually or as a volume). First, an energy profile of each 2D image is obtained 204 according to intensity information of the pixels in the image, the energy profile being represented as (E(x)) where x corresponds to a different A-line in the image. According to one embodiment, the energy in each pixel of the A-line can be represented by its intensity level according to the relationship $E_{i,j}=I_{i,j}{}^n$ = 1, 2, ..., N; j=1, 2, ..., D) where i is the A-line number of a total of NA-lines in the image, j is the depth index in each A-line with a total depth of D; and for image enhancement, n is an adjustable factor controlling the level of enhancement of energy differences between A-lines, and can be any number that is greater than 1. The total energy in each A-line can thus be expressed as $E_i = \sum_{j=1}^{D} E_{i,j} = \sum_{j=1}^{D} I_{i,j}{}^n$.

Figure 3A:
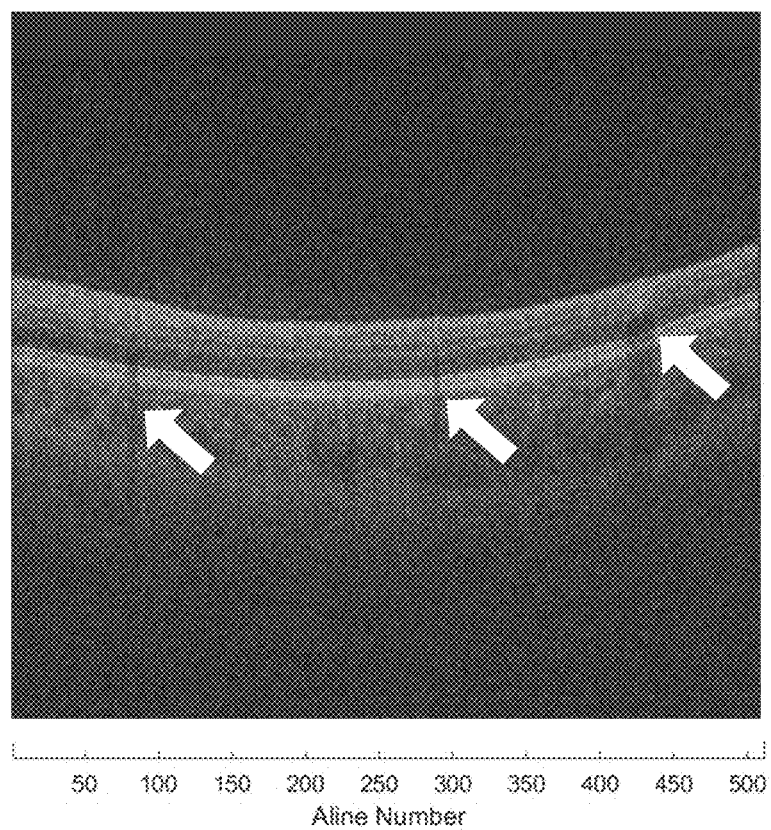
FIGS. 3A, 3B, 3C, 3D illustrate an OCT B-scan having shadows, a corresponding energy profile, a corresponding filtered energy profile, and a corresponding energy profile based on a maximum of the original energy and filtered energy, respectively.
Figure 3B:
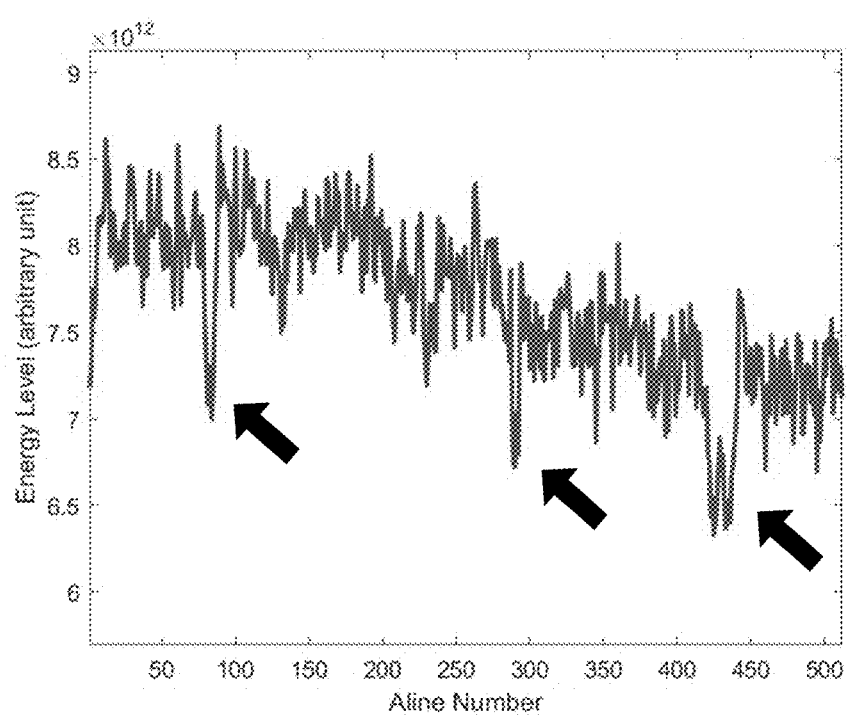

High frequency elements of the energy profile generally represent random speckle in the image, while low frequency elements represent structural information. As seen in FIGS. 3A and 3B, high frequency elements resulting in sharp reductions in energy represent shadows. Therein, it can be seen that the shadow regions of the image of FIG. 3A (the shadow regions being identified by arrows) correspond to sharp drops in energy in the energy profile of FIG. 3B (the drops also being identified by arrows at corresponding A-line numbers).

Considering this and referring back to FIG. 2, the energy profile E(x) is thus then filtered 206 to remove high frequency fluctuations in energy and remove large changes in energy by smoothing the energy profile, thereby effectively recovering the lower energy inside shadow regions. In other words, applying a low pass filter to the energy profile removes high frequency speckle and shadow, while leaving the structural information associated with low frequencies. Such a filter may be of any type suitable for low pass functions, for example, a Butterworth filter, Chebyshev filter, a Bessel filter, or a moving average filter. By filtering the energy profile it is possible to avoid blurring and reduced resolutions caused by simply applying a filter to the image directly. As a result, the sharpness and resolution of the image are not altered by the filtering.

Setting the cut-off frequency of the filter higher than the structural variation frequency ensures that the structural information remains in the image. This cut-off frequency is different for different scan patterns and different focus points, depending on the resolution of each pixel in the image, the curvature of the structure being imaged, and whether the image is in linear or log scale. This is because, for example, some scan patterns can produce 320 A-lines covering a 3 mm physical space or 512 A-lines covering a 6 mm physical space, or still have other custom specified resolution. Further, different regions of interest can have different underlying structures having different physical curvatures (e.g. there is a large curvature around optical nerve head compared to images centered around the macula). Still further, because linear-log scale conversions are not linear, the resulting energy profiles can have different curvatures as well depending on the scale of the image. In view of this, the filter cut-off frequency is preferably tuned for each scan pattern to produce the best performance. For example, for a macula-focused scan 6 mm×6 mm and having 512 A-lines, the cut-off frequency is chosen to be 0.02 for a windowed finite impulse response filter of order 80.

Figure 3C:
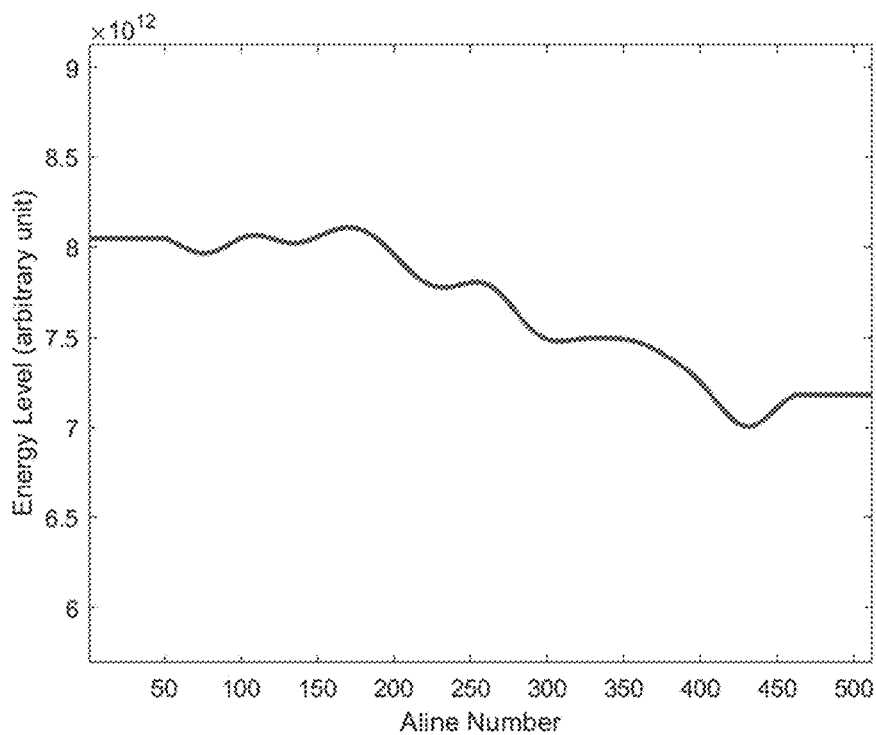

A filtered energy profile corresponding to the energy profile of FIG. 3B is illustrated in FIG. 3C. Comparing FIGS. 3B and 3C, the filtered energy profile is significantly smoother and does not contain the sharp drops indicative of shadows.

Figure 4:
FIG. 4 illustrates detection of a structural region in an OCT B-scan.

Separately from obtaining 204 and filtering 206 the energy profile of each image, the shadow reduction technique 200 optionally detects 208 a structural region (e.g., the object being imaged) within the image. With reference to FIG. 4, the structural region of a retinal OCT B-scan image is detected as the region 400 between the outer and inner portions of the retina, these portions being identified in FIG. 4 by the upper boundary line 402 and the lower boundary line 404. The structural region 400 corresponds to the portion of the image in which the retina is located.

Structural regions may be detected 208 according to any method, for example, by applying a threshold based on the background noise or a similar baseline of the image/imaging system. Such a threshold can be used to distinguish portions of each image merely associated with background noise of the image/system with those associated with the structure of an object in the image, since the structure causes incident light to backscatter. In other embodiments, edge detection techniques can be used to identify a structural region because an intensity gradient boundary line exists between the image background and foreground.

Although the detection of structural regions 208 is shown in FIG. 2 as a parallel operation to obtaining and filtering the energy profile 204, 206, it is noted that these processes do not need to be performed in parallel or simultaneously. Rather, they could be performed sequentially, where the detection of the structural region 208 is performed prior to or after the energy profile is obtained and filtered. It is also noted that in some embodiments where the structural region is detected 208 prior to processes with the energy profile, the energy profile may be obtained 204 and/or filtered 206 only in the detected structural region.

After the energy profile is obtained and filtered 204, 206, the energy of the obtained image 202 is compensated for 210 with the filtered energy profile. If the structural region is optionally detected 208, the compensation 210 may be performed only in the detected structural region. In embodiments in which no structural region is detected 208, the compensation 210 (and thus shadow reduction) is applied across an entire A-line, which can cause the background to appear brighter as an artifact; however, there should not be much difference for the shadow compensation in the structural region.

According to some embodiments, the energy of the images can be compensated by linearly scaling the A-lines of the image to the filtered energy profile. Linear scaling may be particularly used when the light attenuation (e.g., as caused by a shadow) is constant (or approximated as constant), thus the attenuated information can be recovered linear. Such scaling may be based on the filtered energy level itself, where an A-line of the image is scaled to the energy level of the corresponding A-line in the filtered energy profile. More particularly, each pixel intensity within an A-line may be scaled by multiplying the intensity value by a constant (scaling factor) so that the total energy of the A-line after scaling matches the filtered energy. The scaling factor may be a ratio of the filtered energy of an A-line to the original energy at that A-line.

Figure 3D:
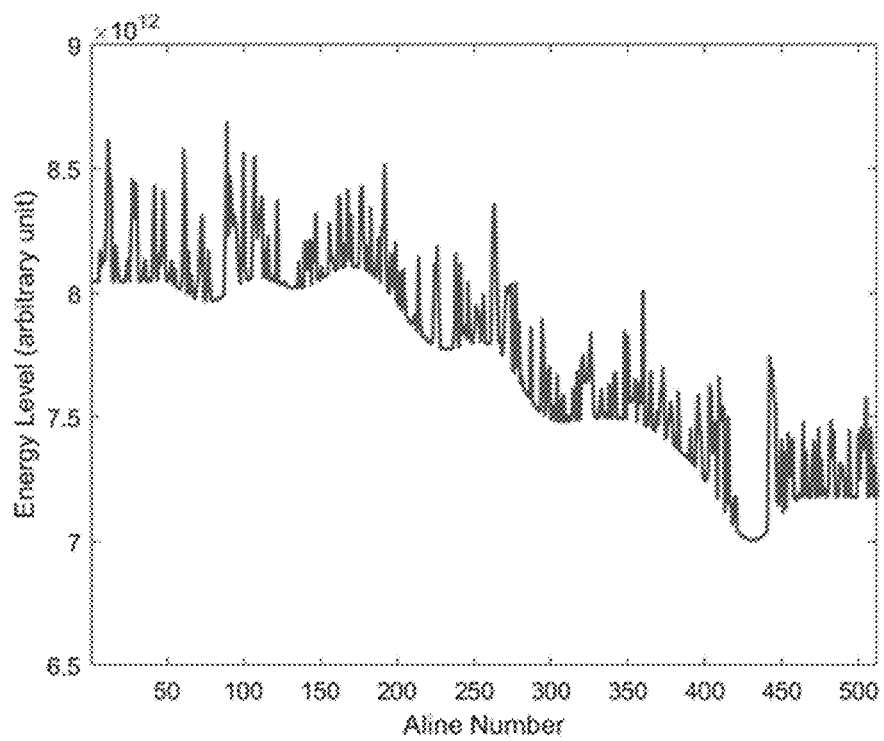

However, other embodiments may utilize variations of the filtered energy profile. For example, the maximum signal of the original energy profile and the filtered energy profile (i.e., $\max(E(x), E_{filtered}(x))$) may be used for scaling purposes. An example of such an energy profile is illustrated in FIG. 3D. In such an embodiment, only A-lines having a filtered energy greater than their original energy are scaled, while the remaining A-lines are maintained with their original energy. In other words, only the A-lines of shadowed regions are scaled. Still further embodiments may utilize functions other than the maximum.

In still other embodiments, scaling may not be linear and instead may, for example, vary as a function of depth. Such embodiments may be utilized when attenuation is varied as a function of depth. In such cases, the scaling function may correspond to/be based on the attenuation function.

Figure 5:
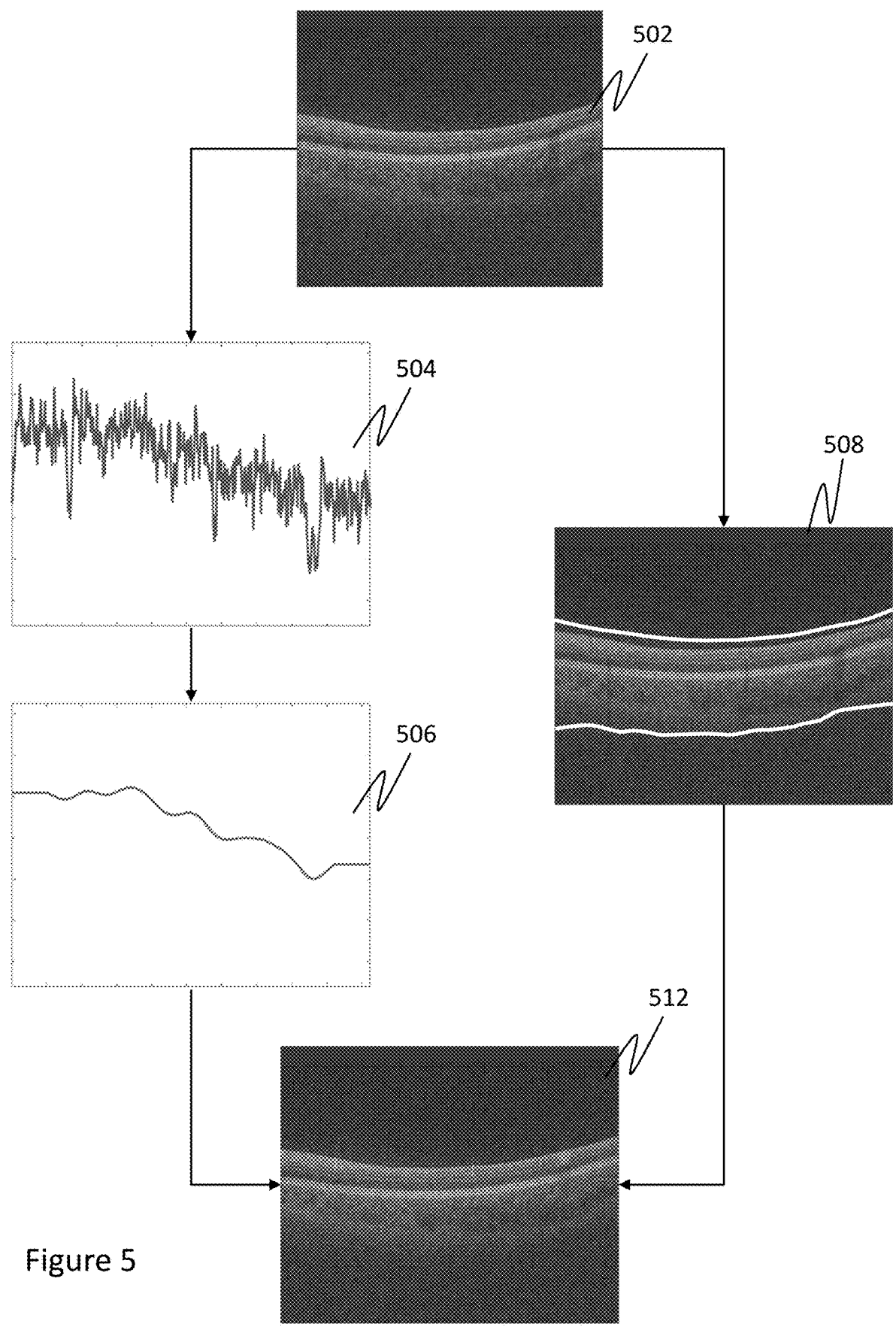
FIG. 5 illustrates the example embodiment of the shadow reduction technique shown in FIG. 2 with visual representations of each step.

The above-described method is further visually illustrated in FIG. 5. Therein, an obtained OCT B-scan image 502 is shown as an input to the steps of the shadow reduction technique. An energy profile 504 of the image 502 and a filtered energy profile 506 as generated according to steps 204 and 206 are also shown with the identified structural region 508 of the image 502 as generated according to step 208. Finally, as shown in FIG. 2, following shadow reduction 200 further processing can be performed on the shadow-reduced image and/or the shadow-reduced image may be displayed, analyzed, or the like 212. Such a finally processed shadow-reduced version 512 of image 502 is shown in FIG. 5.

Figure 6C:
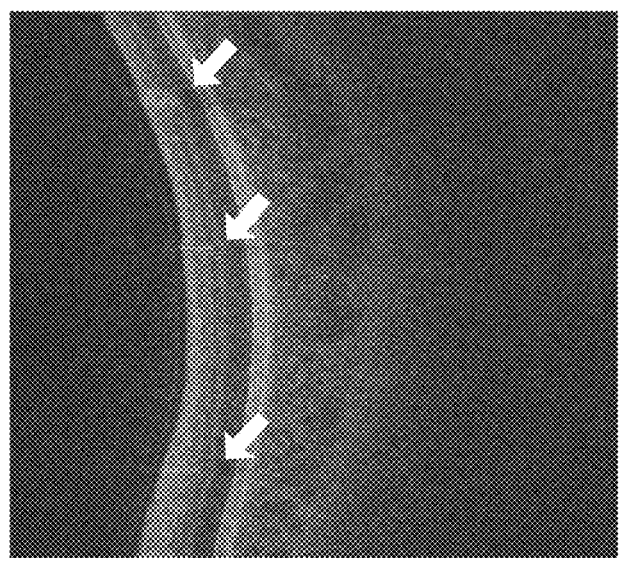
FIGS. 6A, 6B, and 6C illustrate a first example application of the shadow reduction technique described herein.
Figure 6B:
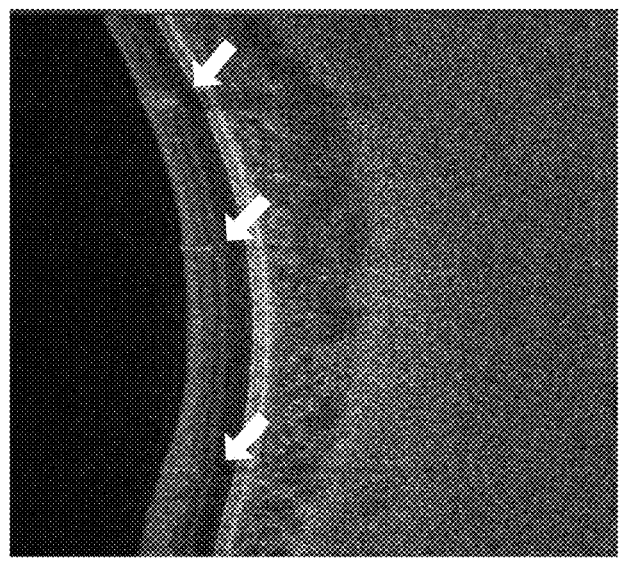
Figure 6A:
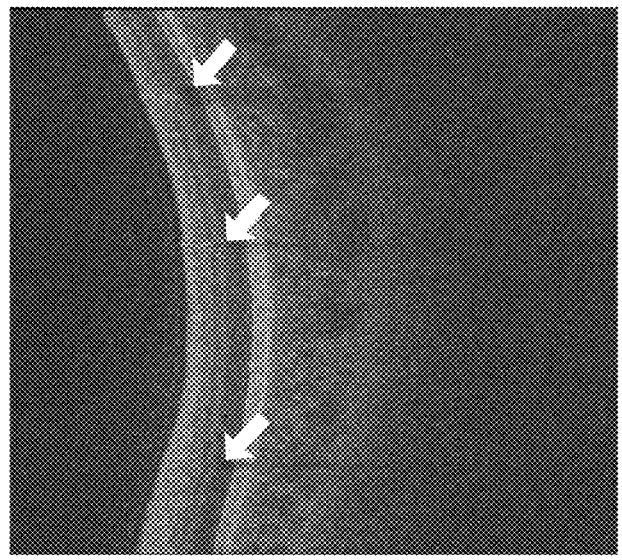

FIGS. 6A-6C and 7A-7C further illustrate example applications of the above-described shadow reduction technique on various OCT B-scan images. Starting with FIG. 6A, a reproduction of the OCT B-scan image of FIG. 1 is shown, with shadows indicated by the arrows therein. FIG. 6B illustrates the application of a current shadow reduction technique to the image of FIG. 6A, and FIG. 6C illustrates application of the shadow reduction technique described herein (the area of shadowing also being identified in FIGS. 6B and 6C by arrows therein) to the image of FIG. 6A. First comparing FIGS. 6A and 6C, a clear reduction of shadow artifact, particularly at inner retinal layers, is seen in the enhanced image of FIG. 6C. Further comparing conventional techniques (FIG. 6B) with that described herein (FIG. 6C), it is seen that conventional shadow reduction results in a grainier/noisier image with a higher contrast than the original image in FIG. 6A. On the other hand, the shadow reduction technique described herein and shown in FIG. 6C has a similar contrast and visual clarity as the original image in FIG. 6A, while providing greater reduction in shadowing. Still further, a greater reduction in shadow artifact can be seen, again particularly at inner retinal layers.

Figure 7A:
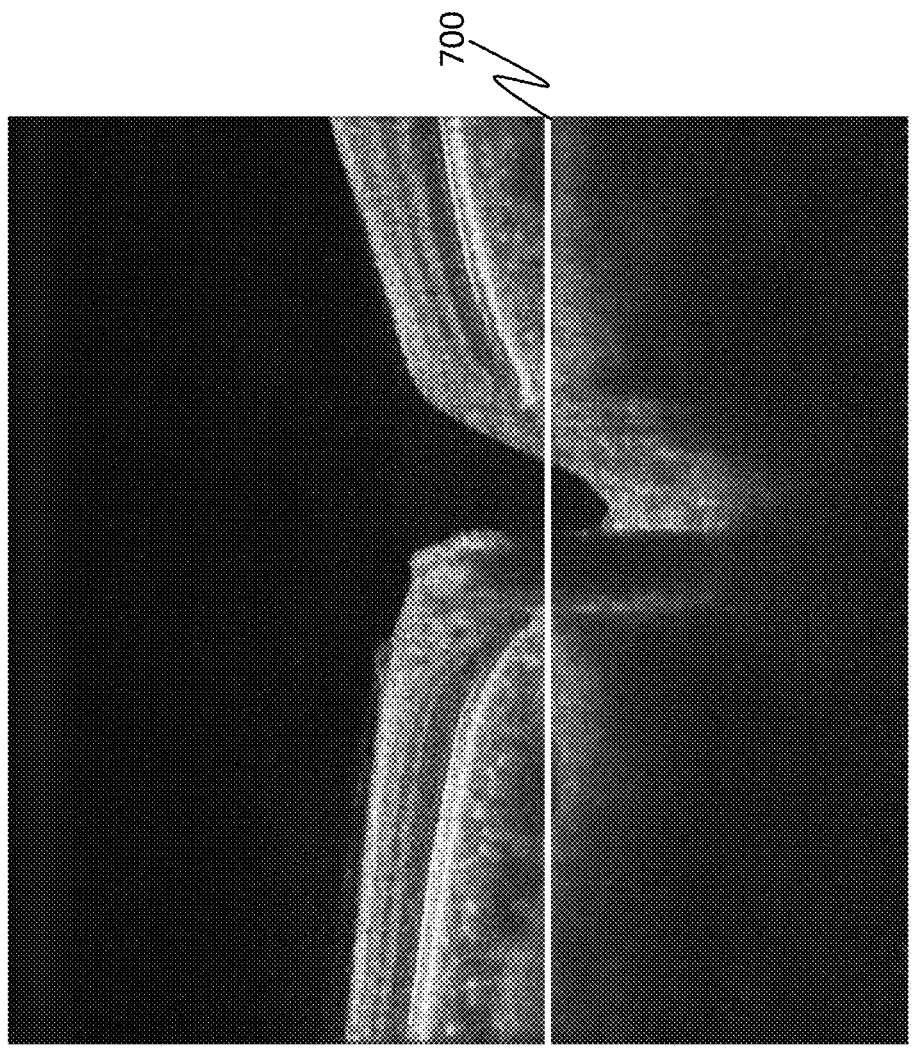
FIGS. 7A, 7B, and 7C illustrate a second example application of the shadow reduction technique described herein.
Figure 7C:
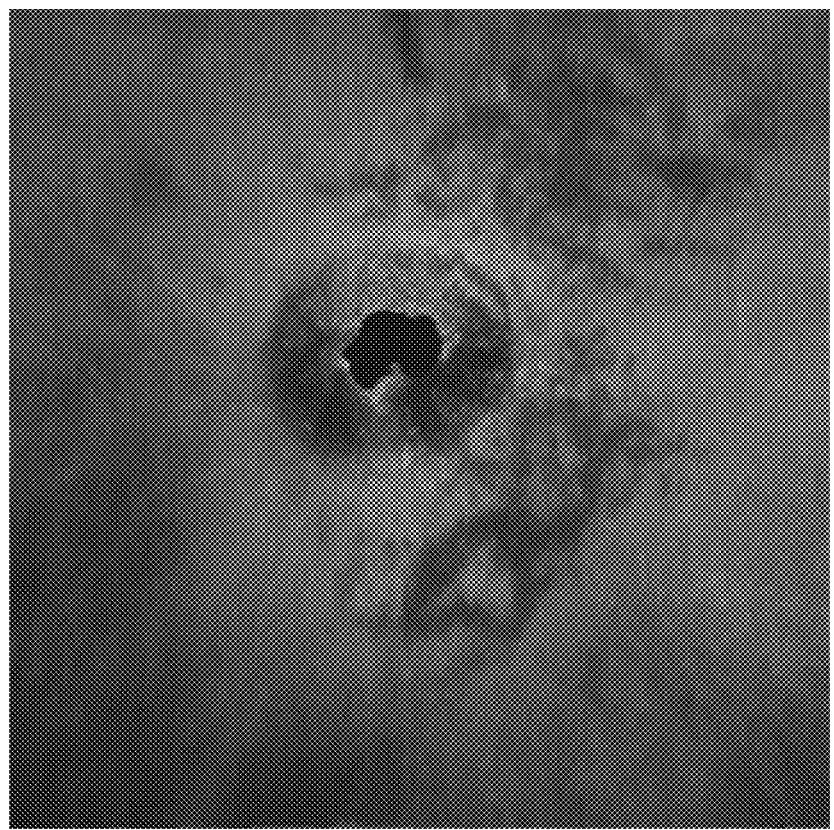
Figure 7B:
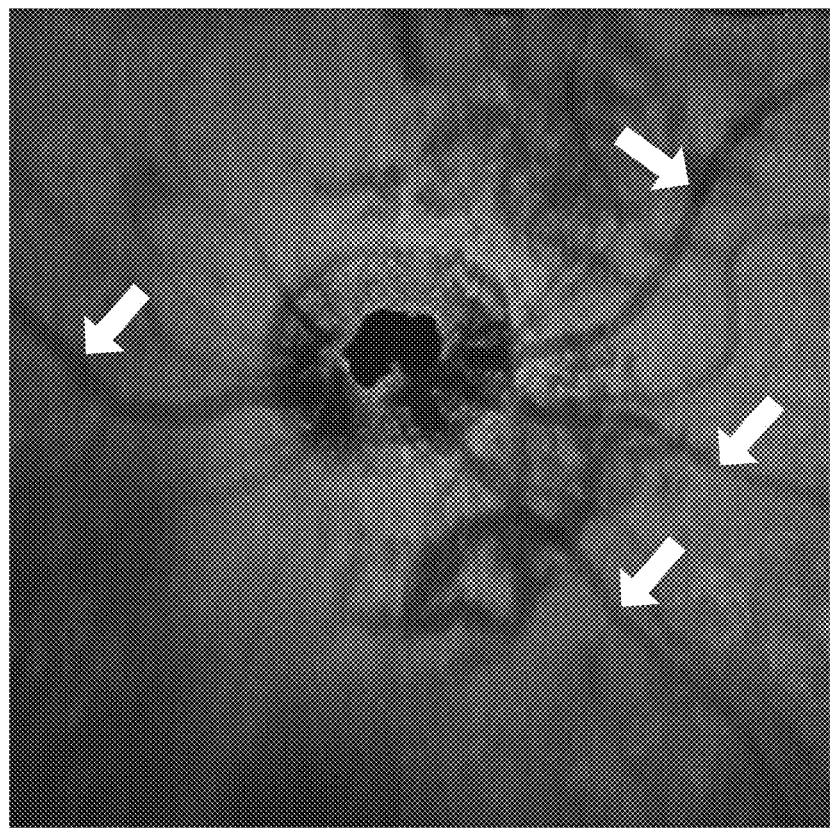

Similarly, FIGS. 7A-7C illustrate the results of applying the above-described shadow reduction technique to a projection image from the choroidal at a region around the optic nerve head. FIG. 7A illustrates a cross-sectional OCT B-scan with the depth of the projection in FIGS. 7B (an original image) and 7C (an enhanced image after applying shadow reduction and noise reduction) indicated by line 700. Comparing FIGS. 7B and 7C, the image of FIG. 7C provides much better visualization of choroidal vessels without interference of shadows caused by vasculature in outer regions of the retina (identified by arrows in FIG. 7B). FIG. 7C also provides for better visualization of structures around the optic nerve head.

While the above shadow reduction technique has been described for two-dimensional (2D) images and one-dimensional (1D) filters (filtering the energy profile of a single 2D image as a function of the A-lines in the image), the same technique may be applied to entire volumes. For example, the technique may be applied to slow-axis B-scans of the volume. Such an application may provide better results for wide vessels. More particularly, where volumes are acquired as a series of B-scans, the acquired B-scans represent cross-sectional images along a fast-axis. Cross-sectional B-scans formed from the acquired volume data along an orthogonal axis (the axis of progression in which the fast-axis B-scans are acquired) are slow-axis cross-sectional images. For example, individual B-scans may be acquired in an X-Z plane successively along a Y-axis. In such a case, the Y axis represents the slow axis and thus B-scan images formed from the volume in the Y-Z plane are slow-axis images. Because the data for each fast-axis B-scan is acquired at a similar point in time, the images are usually smooth. However, because the time between acquisition of each A-line of a slow-axis image is greater, those images are generally not smooth. In these cases, a 2D cross-correlation registration can be applied to the volume to smooth the slow-axis images, and then the above-described shadow reduction technique may be applied to the smoothed volume. This second filtering along the slow-axis can be particularly useful if a blood vessel aligns with the scan direction, thereby casting a wide shadow on fast-axis B-scan images because the same shadow will be much narrower (and thus easier to reduce) along the slow-axis. Further, a 2D filter may be used to process an entire volume at the same time.

In addition to the above-described methods, a system for executing such a shadow reduction technique is also contemplated within the scope of the present disclosure. Such a system may include a computer having one or more processors (e.g., in the form of an integrated circuit(s), discrete circuitry, or the like) for executing the technique, storage (such as a hard disk, memory, RAM, or the like) and an input/output interface (e.g., display, keyboard, mouse, and the like). The execution can be realized by arrangement of discrete components capable of performing the described functionalities (e.g., low pass filtering) and/or by software embodied as instructions stored on a non-transitory computer-readable medium. The storage may be located locally with the computer and/or remotely, for example at a centralized database; and can be used to store OCT images and volume datasets, analysis results, the software for executing the shadow reduction technique, and the like. The system may also be integrated or separate from a system used to capture the OCT images. For example, the computer may be the same as that used to control an optical coherence tomography system.

What is claimed is:

1. An image processing method comprising:
    obtaining an energy profile of an image, the energy profile being a function of A-lines of the image such that each A-line is associated with no more than one energy value;
    low-pass filtering the energy profile; and
    adjusting the image based on the filtered energy profile, wherein adjusting the image comprises independently linearly scaling each of at least one A-line of the image to an energy level of a corresponding A-line in the filtered energy profile, and
    wherein only A-lines having a filtered energy greater than an un-filtered energy are adjusted.

2. The image processing method of claim 1, further comprising:
    identifying a structural region within the image, wherein the image is only adjusted within the structural region.

3. The image processing method of claim 2, wherein the structural region is identified by applying a system noise threshold to the image to generate an upper bound of the structural region and a lower bound of the structural region.

4. The image processing method of claim 2, wherein the structural region is a retina.

5. The image processing method of claim 1, further comprising:
    performing additional image processing techniques on the image after adjusting the image.

6. The image processing method of claim 5, wherein the additional image processing comprises layer segmentation.

7. The image processing of claim 1, wherein:
    the image comprises shadow artifacts, and
    adjusting the image causes attenuation or removal of the shadow artifacts.

8. The image processing method of claim 1, wherein the image is an optical coherence tomography B-scan.

9. The image processing method of claim 1, wherein the image is part of a volume and the method further comprises:
    obtaining a second energy profile of a second image of the volume;
    filtering the second energy profile; and
    adjusting the second image based on the filtered second energy profile.

10. The image processing method of claim 9, wherein the image and the second image are from a fast scanning direction of an imaging protocol used to obtain the volume.

11. The image processing method of claim 9, wherein the image and the second image are from a slow scanning direction of an imaging protocol used to obtain of the volume.

12. An image processing method comprising:
    obtaining a two-dimensional energy profile of a volumetric imaging data set, each element of the two-dimensional energy profile being an energy of an A-line of the volumetric imaging data set such that each A-line is associated with no more than one energy value;

filtering the energy profile by applying a two-dimensional filter; and adjusting the volumetric imaging data set based on the filtered energy profile, wherein adjusting the volumetric imaging data set comprises independently linearly scaling each of at least one A-line of the volumetric imaging data set to an energy level of a corresponding A-line in the filtered energy profile, and wherein only A-lines having a filtered energy greater than an un-filtered energy are adjusted.

13. The image processing method of claim 12, further comprising:

identifying volumetric imaging data of the volumetric imaging data set that corresponds to a structural region, wherein only the volumetric imaging data corresponding to the structural region is adjusted.

14. The image processing method of claim 12, further comprising:

performing additional image processing techniques on the volumetric imaging data set after adjusting the volumetric imaging data set.

15. The image processing method of claim 14, wherein the additional image processing comprises layer segmentation.

16. The image processing method of claim 12, wherein:

images generated from the volumetric imaging data set comprise shadow artifacts, and adjusting the volumetric imaging data set causes attenuation or removal of the shadow artifacts in at least one of the images.

17. The image processing method of claim 12, wherein the two-dimensional filter is a low pass filter.

18. The image processing method of claim 12, wherein the volumetric imaging data set is an optical coherence tomography data set and the volumetric imaging data set is adjusted along a slow scanning direction.

* * * * *